(12) United States Patent
Peynaud et al.

(10) Patent No.: US 8,775,227 B2
(45) Date of Patent: Jul. 8, 2014

(54) PROCESS MODELING SYSTEMS AND METHODS

(75) Inventors: Christophe Peynaud, Leyrieu (FR); Fabrice Dersy, Neuilly Sur Seine (FR); Gaelle Chassaing, Issy-Les-Moulineaux (FR); Els Pauchet, Beynost (FR)

(73) Assignee: Accenture Global Services Limited, Dublin (IE)

( * ) Notice: Subject to any disclaimer, the term of this patent is extended or adjusted under 35 U.S.C. 154(b) by 2617 days.

(21) Appl. No.: 11/532,684

(22) Filed: Sep. 18, 2006

(65) Prior Publication Data

US 2008/0126151 A1 May 29, 2008

(30) Foreign Application Priority Data

Aug. 7, 2006 (EP) .................................. 06291284

(51) Int. Cl.
*G06Q 10/00* (2012.01)

(52) U.S. Cl.
USPC ....................................... 705/7.12

(58) Field of Classification Search
USPC ....................................... 705/7.12
See application file for complete search history.

(56) References Cited

U.S. PATENT DOCUMENTS

2004/0210574 A1* 10/2004 Aponte et al. .................... 707/5
2004/0225549 A1* 11/2004 Parker et al. ..................... 705/8
2005/0071317 A1* 3/2005 Chandrashekhar et al. ...... 707/2

OTHER PUBLICATIONS

Australian Examiner Sunil Kaul, Patent Examination Report No. 3 for Application No. 2007203675, mailed Aug. 10, 2012, 3 pages.
Australian Examiner Sunil Kaul, Patent Examination Report No. 4 for Application No. 2007203675, mailed Nov. 12, 2012, 3 pages.
Australian Examiner Sunil Kaul, Australian Office Action for Application No. 2007203675, mailed Oct. 28, 2011, 2 pages.

* cited by examiner

*Primary Examiner* — Jonathan G Sterrett
(74) *Attorney, Agent, or Firm* — Fish & Richardson P.C.

(57) ABSTRACT

Providers and sourcing locations for recommended optimization processes of operational processes are evaluated based on provider metrics and sourcing metrics. Providers and sourcing locations for the optimization processes are recommended based on the provider and sourcing evaluations.

19 Claims, 17 Drawing Sheets

| | CRITERIA | UNIT OF MEASURE | Location | Weight | Outsourcing | Weight | Transformation | Weight |
|---|---|---|---|---|---|---|---|---|
| OPERATING MODEL | Interactions with organizations that are facing customers | H/M/L | X | | X | | X | |
| | Direct interactions with the customers | H/M/L | X | 1.0 | X | 1.0 | X | 1.0 |
| | Reliance on factors and parties external to the process | H/M/L | X | 1.0 | X | 1.0 | X | 1.0 |
| | Stability of activities (process, tools, organizations) | H/M/L | X | | X | | X | |
| | Need for frequent access and interactions with local experts | H/M/L | X | | X | | X | |
| | % of centralized IT platforms & harmonized processes vs. local/country specific tools & processes | H/M/L | X | 1.0 | X | 1.0 | X | 1.0 |
| | Extended hours of service required (eg 5x24) | H/M/L | X | | X | 1.0 | X | |
| | Level of real time communications exchange required (time zone compatibility) | H/M/L | X | 1.0 | X | | X | |
| | Degree of phone interactions (frequency and average duration) | H/M/L | X | 1.0 | X | | X | |
| BUSINESS SKILLS | Quality flow level of # of iterations and rework, timeliness of execution | H/M/L | X | | X | 1.0 | X | 1.0 |
| | Commonly available & standardized packaged service | H/M/L | X | | X | | X | |
| | Required level of company specific knowledge | H/M/L | X | | X | 1.0 | X | 1.0 |
| | Required level of account/client specific knowledge/experience | H/M/L | X | | X | 1.0 | X | 1.0 |
| | Repetitiveness, recurrence and predictability of step (eg low value/low complexity) | H/M/L | X | 1.0 | X | | X | |
| | Non-core, niche and evolving expertise required | H/M/L | X | 1.0 | X | | X | |
| | Required level of deep expertise or skills (sic & tool related) | H/M/L | X | | X | 1.0 | X | 1.0 |
| | Language of service (multilingual native, non native, English only) | H/M/L | X | 1.0 | X | | X | |
| VOLUME | Headcount intensiveness | H/M/L | X | | X | 1.0 | X | 1.0 |
| | Headcount sensitivity to transaction volume changes | H/M/L | X | | X | 1.0 | X | 1.0 |
| | Volume increase expectations for coming months / years | H/M/L | X | | X | 1.0 | X | 1.0 |
| | Flexibility, variability & seasonality of transactions | H/M/L | X | | X | | X | |
| | Correlation to customer satisfaction / retention | H/M/L | X | | X | 1.0 | X | 1.0 |
| STRATEGIC IMPORTANCE | Process that helps differentiate Entity from competition | H/M/L | X | | X | 1.0 | X | 1.0 |
| | Current level of recourse to non Entity resources | H/M/L | X | | X | 1.0 | X | 1.0 |
| | Autonomy for decision making | H/M/L | X | | X | 1.0 | X | 1.0 |
| | Ability to easily measure activity | H/M/L | X | | X | | X | |
| | Degree of business & process control required by Entity | H/M/L | X | | X | 1.0 | X | 1.0 |
| | Regulation and rules preventing to operate out of the country | H/M/L | X | | X | 1.0 | X | 1.0 |

| | Criteria | UoM | 1 First | | | | 2 Second | 3 Third | 4 Fourth | 5 Fifth | 6 Sixth |
|---|---|---|---|---|---|---|---|---|---|---|---|
| | | | Data | LOC | SRC | TRN | Data | Data | Data | Data | Data |
| OPERATING MODEL | Interactions with organizations that are facing customers | H/M/L | low | 10 | | | medium | high | low | high | high |
| | Direct interactions with the customers | H/M/L | low | 10 | 10 | | low | high | low | high | medium |
| | Reliance on factors and parties external to the process | H/M/L | low | 10 | 10 | | medium | high | high | high | medium |
| | Stability of activities (process, tools, organizations) | H/M/L | low | | | | low | high | high | high | medium |
| | Need for frequent access and interactions with local experts | H/M/L | low | 10 | | 10 | medium | high | high | low | low |
| | % of centralized IT platforms & harmonized processes vs. local/country specific tasks & processes | H/M/L | low | | | | low | high | high | high | medium |
| | Extended hours of service required (eg 24/24) | H/M/L | low | 10 | | | medium | high | high | high | low |
| | Level of real-time communications exchange required (time zone compatibility) | H/M/L | low | | | | low | high | high | high | high |
| | Degree of phone interactions (frequency and average duration) | H/M/L | low | | | 10 | medium | high | high | high | medium |
| | Quality (low level of # of iterations and rework, timeliness of execution) | H/M/L | low | | | | low | high | high | high | high |
| | Commonly available & standardized packaged service | H/M/L | low | | | | medium | high | high | high | medium |
| BUSINESS SKILLS | Required level of company specific knowledge | H/M/L | high | | | | high | high | high | low | high |
| | Required level of process/client specific knowledge/experience | H/M/L | high | 10 | 10 | 10 | low | low | low | low | low |
| | Repetitiveness, recurrence and predictability of tasks (eg low value/low complexity) | H/M/L | high | 10 | 10 | 10 | low | low | low | low | low |
| | Non-core, niche and evolving expertise required | H/M/L | high | 10 | 10 | 10 | high | high | high | high | medium |
| | Required level of deep expertise or skills (job & tool related) | H/M/L | high | | | 5 | high | high | high | high | low |
| | Language of service (multilingual, native, non native, English only) | H/M/L | high | | | 5 | low | low | low | low | medium |
| VOLUME | Headcount intensiveness | H/M/L | high | 10 | 5 | 5 | low | high | low | medium | medium |
| | Headcount sensitivity to transaction volume changes | H/M/L | medium | 10 | 5 | 5 | medium | medium | low | low | medium |
| | Volume increase expectations for coming months / years | H/M/L | medium | 10 | 5 | 5 | low | low | low | high | high |
| STRATEGIC IMPORTANCE | Flexibility, variability & seasonality of transactions | H/M/L | medium | 10 | 5 | 5 | medium | medium | low | medium | medium |
| | Contribution to customer satisfaction / retention | H/M/L | medium | | | | low | low | high | high | high |
| | Process that helps differentiate Entity from competitors | H/M/L | medium | | | | medium | medium | low | low | medium |
| | Current level of reporting to meet Entity requirements | H/M/L | high | | | | low | low | high | low | high |
| | Ability for decision making (eg decision matrix possible) | H/M/L | medium | | | | medium | medium | low | medium | medium |
| | Ability to easily measure activity | H/M/L | medium | | | | low | low | high | high | high |
| | Degree of business & process controls required by Entity (process audits, new projects...) | H/M/L | medium | | | | medium | medium | low | medium | medium |
| | Regulations and rules preventing to operate out of the country | H/M/L | medium | 5 | 5 | 5 | low | low | low | low | high |
| | Location scores | | | | | 7.3 | 6.0 | 4.3 | 6.7 | 3.3 | 3.0 |
| | Outsourcing scores | | | | | 5.0 | 4.3 | 5.2 | 6.9 | 5.5 | 3.5 |
| | Transformation scores | | | | | 7.0 | 7.0 | 4.5 | 2.0 | 3.0 | 4.0 |

FIG. 11

| | CRITERIA | UNIT OF MEASURE | CONTRIBUTION | |
|---|---|---|---|---|
| | | | Impact | Weight |
| Pre requisites | Average employees costs (€) | NA | ≫ | 1.0 |
| | Overall inflation rate (%) | NA | ≫ | 1.0 |
| | Wage inflation (%) | NA | ≫ | 1.0 |
| NON PROJECT SPECIFIC — Competitive Market Place | Direct Competitors | H/M/L | ▨ | 1.0 |
| | Trends in the market | H/M/L | ≫ | 1.0 |
| | Maturity of the BPO industry | H/M/L | ≫ | 1.0 |
| | Privacy Laws / Data Privacy Laws | H/M/L | ▨ | 1.0 |
| Workforce | Expected increase of employees costs | H/M/L | ≫ | 1.0 |
| | Labor Force characteristics | H/M/L | ≫ | 1.0 |
| | Supply of workforce / ability to scale (leadtime & easiness) | H/M/L | ▨ | 1.0 |
| Stability | Political Stability | H/M/L | ▨ | 1.0 |
| | Currency Stability | H/M/L | ≫ | 1.0 |
| Locality Interaction | Level of real time communications exchange required (time zone compatibility) | H/M/L | ≫ | 1.0 |
| | Interactions with organizations that are facing customers | H/M/L | ▨ | 1.0 |
| | Direct interactions with the customers | H/M/L | ▨ | 1.0 |
| PROJECT SPECIFIC — Competencies | Availability of required Competency 1 | Yes/No | ▨ | 1.0 |
| | Availability of required Competency 2 | Yes/No | ▨ | 1.0 |
| | Availability of required Competency 4 | Yes/No | ▨ | 1.0 |
| | Availability of required Competency 5 | Yes/No | ▨ | 1.0 |
| | Availability of required Competency 6 | Yes/No | ▨ | 1.0 |

| | | | ON SHORE SITES | | | NEAR SHORE SITES | | OFF SHORE SITES | | |
|---|---|---|---|---|---|---|---|---|---|---|
| | | | 1 Paris (France) | 2 Nice (France) | 3 Munich (Germany) | 4 Warsaw (Poland) | 2 Montreal (Canada) | 1 Bhratpur (India) | 2 Delhi (India) | 6 Mexico City (Mexico) |
| Criteria | | UoM | Data | Data | Data | Data | Data | Data | Data | Data |
| Average employee costs (€) | | NA | 600 € | 200 € | 100 € | 420 € | 200 € | 650 € | 200 € | 100 € |
| Overall inflation rate (%) | | NA | 3% | 1% | 10% | 3% | 1% | 3% | 1% | 10% |
| Wage Inflation (%) | | NA | 5% | 6% | 5% | 5% | 5% | 5% | 5% | 5% |
| Direct Competitors | | H/M/L | High | High | High | High | High | High | High | High |
| Trends in the market | | H/M/L | Low | Low | Low | Low | Low | Low | Low | Low |
| Maturity of the BPO industry | | H/M/L | Medium | Medium | Medium | Medium | Medium | Medium | Medium | Medium |
| Piracy Laws / Data Privacy Laws | | H/M/L | Low | Medium | Low | High | Low | High | Low | Low |
| Expected increase of employees costs | | H/M/L | High | Low | Low | High | Medium | High | High | Low |
| Labor Force characteristics | | H/M/L | High | Medium | Medium | Low | Medium | Low | Medium | Medium |
| Supply of workforce / ability to scale (leadtime & easyness) | | H/M/L | Low | High | High | Low | High | Low | High | High |
| Political Stability | | H/M/L | Medium | Medium | Medium | Medium | Low | Medium | Medium | Low |
| Currency Stability | | H/M/L | High | High | High | High | High | High | High | High |
| Level of real time communications exchange required | | H/M/L | Low | High | High | Low | High | Low | High | Low |
| Interactions with organizations that are facing customers | | H/M/L | High | High | Low | Yes | High | Low | High | Low |
| Direct interactions with the customers | | Yes/No | Yes | Yes | Yes | Yes | Yes | Yes | No | Yes |
| Availability of required Competency 1 | | Yes/No | Yes | Yes | Yes | Yes | No | Yes | Yes | Yes |
| Availability of required Competency 2 | | Yes/No | No | Yes | Yes | Yes | Yes | Yes | Yes | No |
| Availability of required Competency 3 | | Yes/No | Yes | No | No | No | No | No | No | No |
| Availability of required Competency 4 | | Yes/No | Yes | Yes | Yes | Yes | Yes | No | Yes | Yes |
| Availability of required Competency 5 | | Yes/No | Yes | Yes | Yes | Yes | Yes | Yes | No | Yes |
| Availability of required Competency 6 | | | | | | | | | | |

ON SHORE (490)

| ID | SITE | GENERIC (500) | | PREREQ (510) | | NON PROJECT SPECIFIC (520) | | SIXTH PROCESS (530) | |
|---|---|---|---|---|---|---|---|---|---|
| | | 502 | 504 | 512 | 514 | 522 | 524 | 532 | 534 |
| 1 | Paris (France) | 5.1 | ● | 7.0 | ● | 3.2 | ◐ | ● | 5.7 |
| 2 | Nice (France) | 6.5 | ● | 8.0 | ● | 5.0 | ● | ● | 6.4 |
| 3 | Munich (Germany) | 5.9 | ● | 7.0 | ● | 4.7 | ● | ● | 5.7 |

NEAR SHORE (491)

| ID | SITE | GENERIC (500) | | PREREQ (510) | | NON PROJECT SPECIFIC (520) | | SECOND PROCESS (540) | | THIRD PROCESS (550) | | FIFTH PROCESS (560) | |
|---|---|---|---|---|---|---|---|---|---|---|---|---|---|
| | | 502 | 504 | 512 | 514 | 522 | 524 | 542 | 544 | 552 | 554 | 562 | 564 |
| 4 | Warsaw (Poland) | 5.0 | ● | 8.0 | ● | 3.2 | ◐ | 0.0 | ○ | 2.5 | ◐ | 3.3 | ◐ |
| 5 | Montreal (Canada) | 6.5 | ● | 8.0 | ● | 5.0 | ● | 10.0 | ● | 7.5 | ● | 6.7 | ● |

OFF SHORE (492)

| ID | SITE | GENERIC (500) | | PREREQ (510) | | NON PROJECT SPECIFIC (520) | | FIRST PROCESS (570) | | FOURTH PROCESS (580) | |
|---|---|---|---|---|---|---|---|---|---|---|---|
| | | 502 | 504 | 512 | 514 | 522 | 524 | 572 | 574 | 582 | 584 |
| 6 | Bhratpur (India) | 5.1 | ● | 7.0 | ● | 3.2 | ◐ | 0.0 | ○ | 0.0 | ○ |
| 7 | Delhi (India) | 6.5 | ● | 8.0 | ● | 5.0 | ● | 10.0 | ● | 0.0 | ○ |
| 8 | Mexico City (Mexico) | 5.9 | ● | 7.0 | ● | 4.7 | ● | 5.0 | ◐ | 5.0 | ● |

| | Processes to outsource | Type of providers |
|---|---|---|
| OUTSOURCE | Process #1 | BPO providers with transformational capabilities |
| | Process #2 | BPO providers with specific expertise |
| | Process #3 | IT Outsourcing providers |
| | | |
| | | |
| | | |
| OUTTASK | Process #4 | IT Outsourcing providers |
| | Process #5 | Other Providers |
| | | |
| | | |

FIG. 14

| | BPO providers with transf. capabilities | BPO providers with specific expertise | ITO providers | Other Providers |
|---|---|---|---|---|
| EXISTING | Provider #1 | Provider #2 | Provider #3 | Provider #5 |
| | | | Provider #4 | |
| | | | | |
| | | | | |
| NEW | Provider #6 | Provider #7 | | Provider #8 |
| | | | | |

FIG. 15

| CRITERIA | | UNIT OF MEASURE | CONTRIBUTION | |
|---|---|---|---|---|
| | | | Impact | Weight |
| Generic Provider Criteria | General Information — Market share | H/M/L | ↑ | 1.0 |
| | General Information — International clients | H/M/L | ↑ | 1.0 |
| | Financial stability — History providing the service | H/M/L | ↑ | 1.0 |
| | Financial stability — Gross revenue trend | H/M/L | ↑ | 1.0 |
| | Financial stability — Profitability | H/M/L | ↑ | 1.0 |
| | GEO Coverage — Existing common local, near-shore, off-shore operating model | H/M/L | ↑ | 1.0 |
| | GEO Coverage — Proximity of the provider | H/M/L | ↑ | 1.0 |
| | Service Mgmt — Security guarantees | H/M/L | ↑ | 1.0 |
| | Service Mgmt — Time of service set-up | H/M/L | ↑ | 1.0 |
| | Service Mgmt — Recruiting / training / coaching methodology | H/M/L | ↑ | 1.0 |
| | Service Mgmt — Know-how in delocalizing activities | H/M/L | ↑ | 1.0 |
| | Service Mgmt — Capability to ensure business continuity | H/M/L | ↑ | 1.0 |
| | Service Mgmt — Capability to manage the IT infrastructure | H/M/L | ↑ | 1.0 |
| Project Specific Provider Criteria | Process #1 | Yes/No | ↑ | 1.0 |
| | Process #2 | Yes/No | ↑ | 1.0 |
| | Process #3 | Yes/No | ↑ | 1.0 |
| | Process #4 | Yes/No | ↑ | 1.0 |
| | Process #5 | Yes/No | ↑ | 1.0 |

FIG. 16

| Block | Criteria | UoM | 1 Provider #1 | | 2 Provider #2 | | 3 Provider #3 | | 4 Provider #4 | | 5 Provider #5 | | 6 Provider #6 | | 7 Provider #7 | | 8 Provider #8 | |
|---|---|---|---|---|---|---|---|---|---|---|---|---|---|---|---|---|---|---|
| | | | Data | | Data | | Data | | Data | | Data | | Data | | Data | | Data | |
| General Information | Market share | H/M/L | High | | Low | | High | | High | | High | | High | | High | | High | |
| | International clients | H/M/L | High | | High | | High | | High | | Low | | High | | Low | | Medium | |
| Financial Stability | History providing the service | H/M/L | Medium | | Medium | | Medium | | Medium | | Medium | | Medium | | Low | | Medium | |
| | Gross revenue trend | H/M/L | High | | Low | | Low | | Low | | Low | | Low | | High | | Medium | |
| | Profitability | H/M/L | High | | Low | | Low | | Low | | Low | | Low | | High | | Medium | |
| GEO Coverage | Existing common local, near-shore, off-shore operating model | H/M/L | High | | Medium | | High | | Medium | | High | | Low | | High | | Low | |
| | Proximity of the provider | H/M/L | High | | High | | High | | Low | | Low | | Low | | High | | Low | |
| Service Mgmt. | Security guarantees | H/M/L | High | | Medium | | High | | Low | | High | | Low | | High | | Low | |
| | Time of service set-up | H/M/L | Low | | Low | | Low | | Low | | Low | | Low | | Low | | Low | |
| Project Specific Provider | Reskilling / training / coaching methodology | H/M/L | Low | | Low | | High | | Low | | Low | | Low | | Low | | Medium | |
| | Know-how in delocalizing activities | H/M/L | Low | | Medium | | Medium | | Low | | High | | High | | Medium | | High | |
| | Capability to ensure business continuity | H/M/L | Low | | Low | | Low | | Low | | Low | | Low | | Low | | High | |
| | Capability to manage the IT infrastructure | H/M/L | Low | | Medium | | Medium | | Low | | Low | | Low | | Low | | High | |
| | Process #1 | Yes/No | Yes | | Yes | | No | | Yes | | No | | No | | Yes | | Yes | |
| | Process #2 | Yes/No | No | | Yes | | No | | No | | Yes | | Yes | | No | | No | |
| | Process #3 | Yes/No | Yes | | No | | Yes | | Yes | | Yes | | Yes | | Yes | | No | |
| | Process #4 | Yes/No | Yes | | No | | Yes | | No | | Yes | | No | | Yes | | Yes | |
| | Process #5 | Yes/No | Yes | | Yes | | Yes | | Yes | | Yes | | Yes | | No | | Yes | |

PROCESS MODELING SYSTEMS AND METHODS

This application claims the benefit of foreign priority under 35 U.S.C. §119 to European Patent Application Ser. No. 06 291 284.5, filed on Aug. 7, 2006, the disclosure of which is incorporated herein by reference.

BACKGROUND AND SUMMARY

This document generally relates to operations modeling, and in particular relates to optimizing operational processes by identifying operational processes eligible for centralization, reengineer, and/or outsourcing, and identifying sourcing locations and providers for the operational processes.

A company may analyze its operational processes in an attempt to optimize the processes to achieve cost savings, improved scalability, or some other optimization objective. For example, a company may analyze the operational process involved in manufacturing an engine, and may determine that significant cost savings may be generated if the process of machining the engine block was reengineered and outsourced while the process of building the engine from the machined block remained unchanged.

The operational processes may be optimized by either keeping the process in-house or outsourcing the process, by reengineering the process, out-tasking the process, or by implementing some other optimization process. Additionally, the operational process may be further optimized by identifying sourcing locations to locate the performance of the operational process and providers to perform the operational process. Choosing an optimization process for an operational process, however, is difficult in the absence of a systematic and objective evaluation.

Disclosed herein is a process modeling system and method to evaluate which operational processes should be centralized, reengineered, outsourced, or out-tasked, and for selecting locations for the operational processes.

BRIEF DESCRIPTION OF THE DRAWINGS

FIG. 9 is a table of example operational process assessment criteria and multiple dimension metrics.

FIG. 10 is a table of dimensional scores corresponding to the assessment criteria and dimension metrics of FIG. 9.

FIG. 11 is a table of example sourcing location assessment criteria and site metrics.

FIG. 12 is a table of example evaluation data for onshore, nearshore and offshore sourcing locations.

FIG. 13 provides summary tables of the example evaluations based on the data of the table of FIG. 12.

FIG. 14 is a table of providers to analyze for outsourcing or out-tasking.

FIG. 15 is a table of providers to analyze by provider expertise.

FIG. 16 is a table of example provider assessment criteria and provider metrics.

FIG. 17 is a table of example evaluation data for providers.

FIG. 18 is a summary table of the example evaluations based on the data of FIG. 17.

FIG. 22 is a flow diagram of an example process of evaluating sourcing locations.

DETAILED DESCRIPTION

Figure 1:
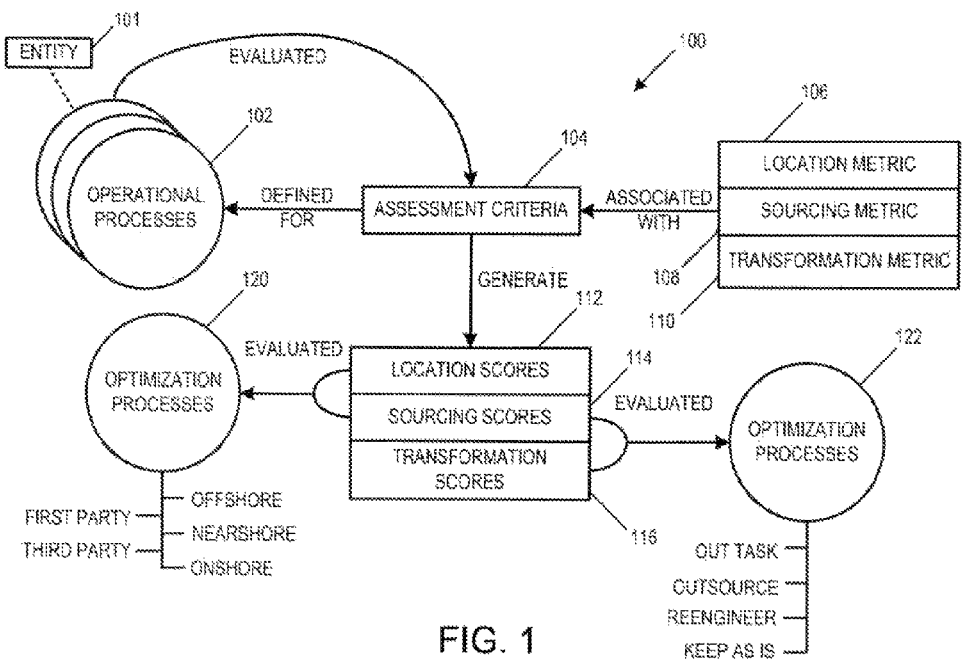
FIG. 1 is an entity relationship of a system for analyzing operational processes.

FIG. 1 is an entity relationship diagram of a system 100 for analyzing operational processes 102. Assessment criteria 104 are defined for the operational processes 102 of an entity 101, such as a business or business unit of a company. In one implementation, the assessment criteria may be the same for all operational processes 102. In a different implementation, the assessment criteria 104 may be tailored to each operational process 102. In a different implementation, the assessment criteria 104 may be tailored to each operational process 102. For example, if an operational process 102 is a claims process for an insurance company, and requires direct contact with clients, then an example assessment criterion may include "Direct interactions with customers." Conversely, if the operational process 102 is a machining process for an engine block, then the example assessment criteria may not include "Direct interactions with customers."

Multiple evaluation dimensions are associated with the assessment criteria 104. In the example system 100 of FIG. 1, corresponding location metrics 106, sourcing metrics 108, and transformation metrics 110 are associated with the assessment criteria 104. In one implementation, the corresponding metrics 106, 108 and 110 provide metrics for determining which processes 102 should be outsourced, reengineered, or remain unchanged based on the assessment criteria 104, and at which level of location (onshore, nearshore, and offshore) the processes should be performed. The metrics 106, 108 and 110 may determine whether an operational process 102 is more eligible or less eligible for an optimization process based on the corresponding assessment criteria 104.

The operational processes 102 are evaluated against the assessment criteria 104 and corresponding metrics 106, 108 and 110 to generate location scores 112, sourcing scores 114, and transformation scores 116. The location scores 112, sourcing scores 114 and transformation scores 116 may then be evaluated against each other to identify first and second optimization processes 120 and 122 for the operational processes 102.

In one example implementation, the first optimization processes 120 are location and sourcing optimization processes, and the second optimization processes are sourcing and transformation optimization processes. For example, the location scores 112 may be evaluated against the sourcing scores 114 to identify first optimization processes 120 for the operational processes 102. The first optimization processes 120 may include moving a process to an offshore location, a nearshore location, or an onshore location.

An offshore location may be a location that is geographically distant from the location at which an operational process is currently performed or the location at which the business headquarters are currently located. For example, India may be an offshore location for Western Europe and North America.

A nearshore location may be a location that are generally geographically nearer than offshore locations and/or is culturally similar to the current location at which an operational process is currently performed or the location at which the business headquarters are currently located. For example, Canada may be a nearshore location for the United States, and Eastern Europe may be a nearshore location for France.

An onshore location may be a location within the same country that the operational process is currently performed or the business headquarters are currently located.

The operational processes 102 may also be optimized by determining whether the operational processes 102 should be first party managed or third party managed. First party managed operational processes are processes that are managed by the entity 101, while third party managed operational processes are processes that are managed by a third party. Thus, the first optimization processes 120 may also include identifying whether an operational process 102 that is to be moved to an offshore location, a nearshore location, or an onshore location should be first party managed or third party managed.

Likewise, the transformation scores 116 may be evaluated against the sourcing scores 114 to identify second optimization processes 122 for each operational process 102. The second optimization processes 122 may include reengineering an operational process, out-tasking an operation process, outsourcing an operational process, or keeping the operational process as is.

Reengineering an operational process may involve one or more changes in an operational process or harmonization between disparate processes. For example, reengineering a claims process for an insurance company that processes all claims in the same manner may include adding a determination of whether a claim exceeds a threshold value, and processing claims that exceed the threshold value in an expedited manner.

Out-tasking an operational process may involve shifting the execution of an operational process to an outside resource, without changing the operational process. For example, out-tasking the machining of engine blocks may involve machining the engine blocks at a nearshore location by the same operational process currently implemented at an onshore location.

Outsourcing an operational process may involve shifting the execution of an operational process to an outside resource and reengineering the operational process. For example, outsourcing an operational process may involve contracting a third party to improve and harmonize the process prior to executing the outsourced process. The improvement and harmonization may be determined solely by the third party, or may be determined in conjunction with the entity 101.

The operational processes 102 may be further defined by a Full Time Equivalent (FTE) value indicative of the number of full time workers for a process. Additionally, the FTE value may be divided into an internal FTE value and an external FTE value, which are respectively indicative of entity resources and third-party resources performing the operational process. For example, an operational process may have an associated FTE value of 20, indicating that 20 persons are employed to perform the process. The FTE value may have an internal FTE value of 12 and an external FTE value of 8, indicating that 12 persons are employed by the entity and 8 persons are employed by a third party to perform the operational process.

The operational process 102 may also be defined by periodic resource requirements. The FTE forecasts may also include internal and external FTE values for each of the periodic resource requirements. For example, the FTE value, and internal and external FTE values, for an operational process may be as shown in Table 1 below:

TABLE 1

Example FTE Requirements

| Year | FTE Value | Internal FTE Value | External FTE Value |
|---|---|---|---|
| 2009 | 20 | 12 | 8 |
| 2010 | 22 | 12 | 10 |
| 2011 | 25 | 15 | 10 |
| 2012 | 25 | 12 | 13 |

The FTE values may be used to assess the process sourcing and redesign impacts on the entity 101. For example, if a process has a large FTE value and a large external FTE value, then the process may be an adequate candidate process for an outsourcing optimization; an process having a large FTE value and a large internal FTE value may incur a significant non-recurring cost if the operational process is outsourced, etc.

Figure 2:
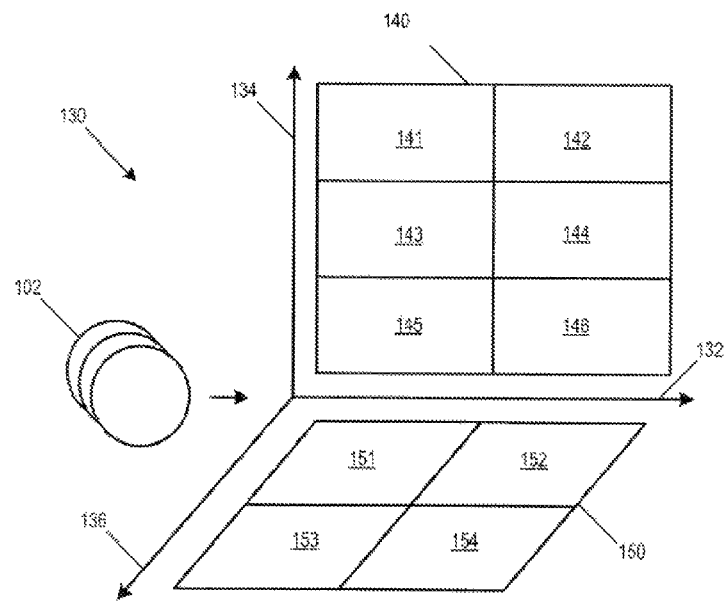
FIG. 2 is a functional diagram of a system for analyzing operational processes across multiple dimensions.

FIG. 2 is a functional diagram of a system 130 for analyzing operational processes 102 across multiple dimensions. The function diagram of FIG. 2 may also define a graphical user interface that may be implemented to display the analysis results of the system 100 of FIG. 1. The operational process 102 may be evaluated across a sourcing scale 132, a location scale 134, and a transformation scale 136. Each operational process 102 may have an associated location score, sourcing score and transformation score that may be mapped into optimization spaces 140 and 150 to identify appropriate optimization processes.

Evaluation of the operational processes 102 against the sourcing scale 132 and the location scale 134 may identify a first set of optimization processes in the optimization space 140. The first set of optimization processes 140 may include executing the operational process 102 at one of a first party managed offshore operation 141, a third party managed offshore operation 142, a first party managed nearshore operation 143, a third party managed nearshore operation 144, a first party managed onshore operation 145, and a third party managed onshore operation 146. In the example evaluation of the operational processes 102 against the sourcing scale 132 and the location scale 134, the sourcing scale 132 is primarily indicative of whether an operational process should be first party managed or third party managed, and the location scale 134 is primarily indicative of whether an operational process should be located onshore, nearshore, or offshore.

Likewise, evaluation of the operational processes 102 against the sourcing scale 132 and the transformation scale 136 may identify a second set of optimization processes in the optimization space 150. The second set of optimization processes 150, may include keeping the operational process "as is" 151, out-tasking 152, reengineering 153, and outsourcing 154.

In the example evaluation of the operational processes 102 against the sourcing scale 132 and the transformation scale 136, the sourcing scale 132 is primarily indicative of whether an operational process should be performed by a third party, and the transformation scale 136 is primarily indicative of whether an operational process should be reengineered or kept as is.

Figure 3:
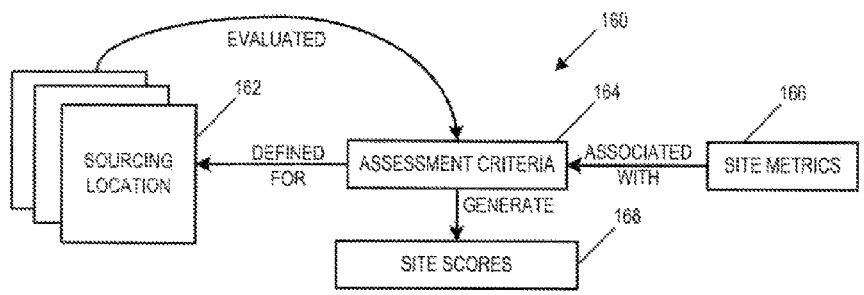
FIG. 3 is an entity relationship diagram of a system for analyzing sourcing locations.

FIG. 3 is an entity relationship diagram of a system 160 for analyzing sourcing locations 162. The system 160 may be used in conjunction with the system 100 of FIG. 1. In particular, the system 160 may be used to evaluate onshore, nearshore and offshore sourcing locations 162 for the operational processes 102. Assessment criteria 164 are defined for the sourcing locations 162. In one implementation, the assessment criteria 164 may be the same for all sourcing locations 162. In another implementation, the assessment criteria 164 may be tailored to each sourcing location 162.

Corresponding site metrics 166 are associated with the assessment criteria 164. The site metrics 166 may determine whether a sourcing location 162 is more eligible or less eligible for receiving an operational process 102 based on the corresponding assessment criteria 164. The assessment criteria 164 may include non-process specific assessment criteria and process specific assessment criteria. Non-process specific assessment criteria are criteria that are independent of an operational process 102, e.g. political stability, employment restrictions, etc. Conversely, process specific assessment criteria are criteria are specific to an operational process, e.g., an operational process 102 may require several specific competencies such as tooling, software and publishing.

The sourcing locations 162 are evaluated against the assessment criteria 164 and the site metrics 166 to generate site scores 168. The site scores 168 may be used to determine which sourcing location 162 is best qualified to received an operational process 102.

Figure 4:
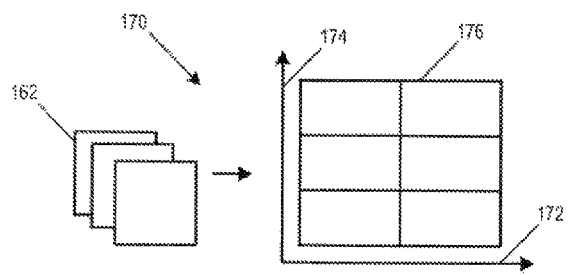
FIG. 4 is a functional diagram of a system for analyzing sourcing locations based on an operational process analysis and a sourcing location analysis.

FIG. 4 is a functional diagram of a system 170 for analyzing sourcing locations 162 based on an operational process analysis and a sourcing location analysis. The operational process analysis may evaluate operational processes against a sourcing scale 172 and a location scale 174 to identify a set of optimization processes in an optimization space 176. These optimization processes include executing the operational processes at one of a first party managed offshore operation, a third party managed offshore operation, a first party managed nearshore operation, a third party managed nearshore operation, a first party managed onshore operation, and a third party managed onshore operation.

Each sourcing location 162 has an associated site score 168 to determine which sourcing location 162 is best qualified to receive an operational process that is to be optimized. For example, if a particular operational process performed by an entity in France is to be located nearshore, then Munich, Warsaw and Rome may be possible nearshore sourcing locations 162. Each sourcing location is evaluated based on the assessment criteria 164 and site metrics 166 to generate site scores 168. The sourcing location 162 with the highest score for the particular operational process is thus determined to be the best qualified to receive the particular operation process.

Figure 5:
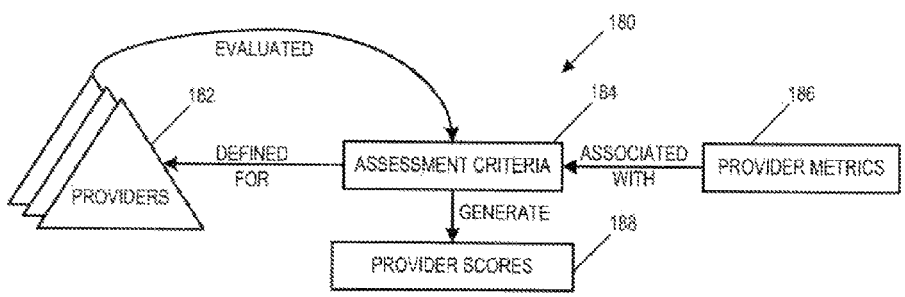
FIG. 5 is an entity relationship diagram of a system for analyzing providers.

FIG. 5 is an entity relationship diagram of system 180 for analyzing providers 182. The system 180 may be used in conjunction with the system 100 of FIG. 1. In particular, the system 180 may be used to evaluate providers 182 for performing the operational processes 102. Assessment criteria 184 are defined for the providers 182. In one implementation, the assessment criteria 184 may be the same for all providers 182. In another implementation, the assessment criteria 184 or may be tailored to each provider 182.

The assessment criteria 184 may include non-process specific assessment criteria and process specific assessment criteria. Non-process specific assessment criteria are criteria that are independent of an operational process 102, e.g., market share, market capitalization, etc. Conversely, process specific assessment criteria are criteria that are specific to an operational process.

Corresponding provider metrics 186 are associated with the assessment criteria 184. The provider metrics 186 may determine whether a provider 182 is more qualified or less qualified for performing an operational process 102 based on the corresponding assessment criteria 184.

The providers 182 are evaluated against the assessment criteria 184 and provider metrics 186 to generate provider scores 188. The provider scores 188 may be used to determine which provider 182 is best qualified to perform an operational process 102.

Figure 6:
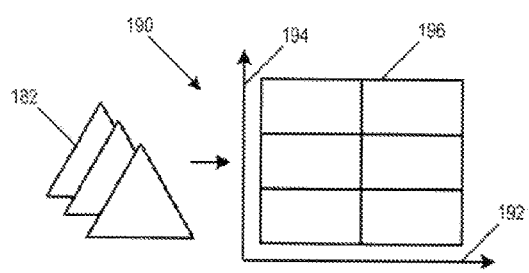
FIG. 6 is functional diagram of a system for analyzing providers based on an operational process and a provider analysis.

FIG. 6 is a functional diagram of a system 190 for analyzing providers 182 based on an operational process analysis and a provider analysis. The operational process analysis may evaluate operational processes against a sourcing scale 192 and a location scale 194 to identify a set of optimization processes in an optimization space 196. These optimization processes may include moving an operational process to one of a first party managed offshore location, a third party managed offshore location, a first party managed nearshore location, a third party managed nearshore location, a first party managed onshore location, and a third party managed onshore location.

Each provider 182 has an associated provider score 188 to determine which provider 182 is best qualified to perform an operational process that is to be optimized within the optimization space. For example, if a particular operational process performed by an entity in France is to be located nearshore and third party managed, then first and second providers in Munich, Warsaw and Rome may be possible providers 182. Each provider is evaluated based on the assessment criteria 184 and provider metrics 186 to generate provider scores 188. The provider 182 with the highest score for the particular operational process is thus determined to be the best qualified to perform the particular operational process.

Figure 7A:
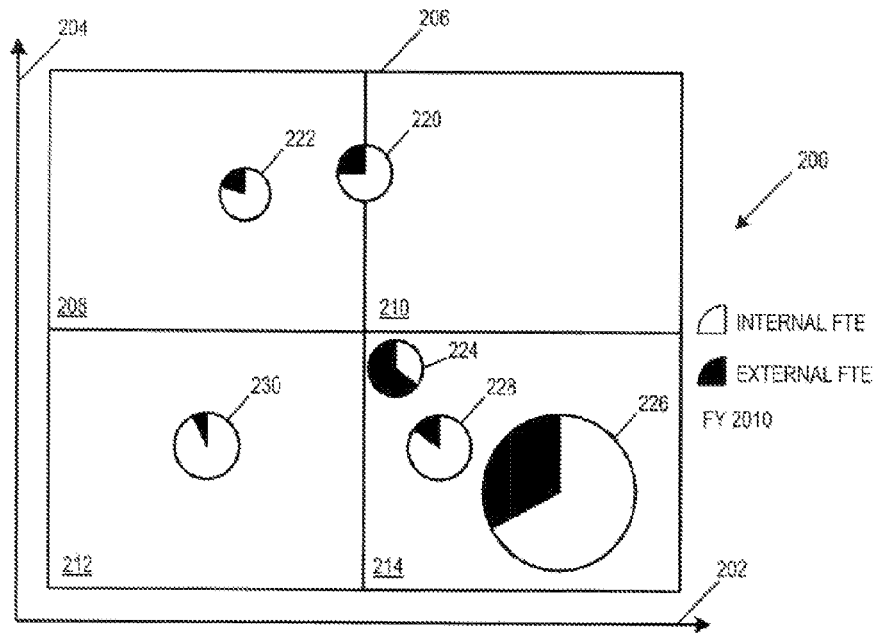
FIG. 7A is a graphical display of operational processes evaluated against a sourcing metric and a transformation metric at a first time.

FIG. 7A is a graphical display 200 of operational processes evaluated against a sourcing metric and a transformation metric. The graphical display of FIG. 7A may be used to graphically display the results of an optimization analysis of operational processes.

A first axis 202 is mapped to a first metric and a second axis 204 is mapped to a second metric. In the example graphical display 200, the first metric is a sourcing metric and the second metric is a transformation metric. The mapping of the sourcing metric and transformation metric defines an optimization space 206 that includes a reengineer space 208, an outsource space 210, a keep as is space 212, and an out-task space 214.

Graphical display elements 220, 222, 224, 226, 228 and 230 are generated for each corresponding operational process that is analyzed. The corresponding operational processes have associated sourcing scores and transformation scores. The graphical display elements 220, 222, 224, 226, 228 and 230 are rendered on the graphical display according to sourcing scores and transformation scores of the corresponding operational processes. The placement of the graphical display elements 220, 222, 224, 226, 228 and 230 are thus indicative of the optimization process selected or recommended for the operational processes. For example, as shown in FIG. 7A, a reengineering is recommended to optimize the operational process 222; the operational process associated with display element 230 should be kept as is; and the operational processes associated with display elements 224, 226, and 228 should be out-tasked. The operational process associated with display element 220, which is mapped equally between the reengineer space 208 and the outsource space 210, may be either reengineered or outsourced to achieve optimization.

The graphical display elements 220, 222, 224, 226, 228 and 230 may also include visual indicia to display additional information regarding corresponding operational processes. For example, the graphical display elements may be scaled in size according to a resource requirement of corresponding operational process. For example, the graphical display elements 220, 222, 224, 226, 228 and 230 of FIG. 7A are scaled according to FTE values, with a shaded region corresponding to an external FTE value and an unshaded region corresponding to an internal FTE value.

Figure 7B:
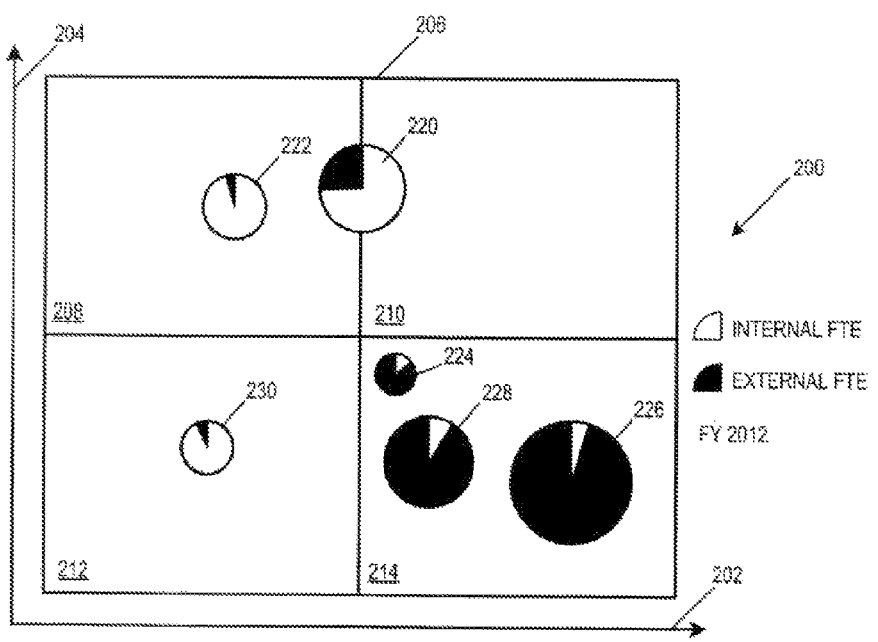
FIG. 7B is the graphical display of the operational processes evaluated against the sourcing metric and the transformation metric at a forecasted time.

FIG. 7B is the graphical display of the operational processes evaluated against the sourcing metric and the transformation metric at a forecasted time. The FTE values, included the internal FTE values and external FTE values, are changed accordingly.

Other visual indicia may also be used. For example, the graphical display elements 220, 222, 224, 226, 228 and 230 could be toggled in size to first show the internal FTE values, and then to show the external FTE values.

Figure 8:
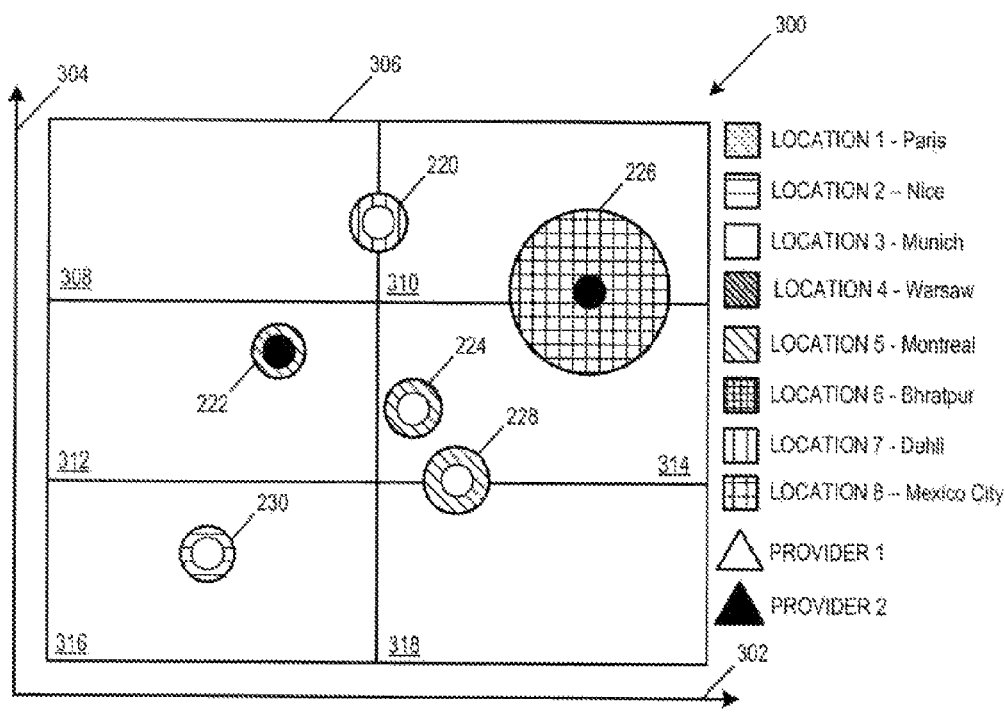
FIG. 8 is a graphical display of operational processes evaluated against a sourcing metric and a location metric.

FIG. 8 is a graphical display 300 of operational processes evaluated against a sourcing metric 302 and a location metric 304. A first axis 302 is mapped to a sourcing metric and a second axis 304 is mapped to a location metric. The mapping of the sourcing metric and the transformation metric defines an optimization space 306 that includes a first party managed offshore space 308, a third party managed offshore space 310, a first party managed nearshore space 312, a third party managed nearshore space 314, a first party managed onshore space 316, and a third party managed onshore space 318.

The graphical display elements 220, 222, 224, 226, 228 and 230 are rendered on the graphical display 300 according to sourcing scores and location scores of the corresponding operational processes. The placement of the graphical display elements 220, 222, 224, 226, 228 and 230 are thus indicative of the optimization process selected or recommended for the operational processes. For example, as shown in FIG. 8, the operational process associated with the display element 230 should be first party managed onshore; the operational process associated with the display element 22 should be first party managed nearshore; the operational processes associated with display elements 224 and 228 should be third party managed nearshore; and the operational process associated with the display element 226 should be third party managed offshore. The operational process associated with display element 220, which is mapped equally between the first party managed offshore space 308 and the third party managed onshore space 310, may be moved offshore and managed by either the entity or by a third party to achieve optimization.

In FIG. 8, the graphical display elements 220, 222, 224, 226, 228 and 230 also include visual indicia to display information related to sourcing locations 162 and providers 182. The example graphical display elements 200, 222, 224, 226, 228 and 230 define an outer circular space indicative of a sourcing location, e.g. locations 1-8, and an inner circular space indicative of providers, e.g. providers 1 and 2. Thus, each graphical display elements 220, 222, 224, 226, 228 and 230 visually conveys a suggested location and a suggested provider for each corresponding operation process. For example, operational processes corresponding to the graphical elements 222, 225 and 228 are to be located nearshore at location 5 (Montreal), with the operational process corresponding to the graphical element 222 being performed by provider 2, and the remain operational process corresponding to the graphical elements 224 and 228 being performed by provider 1.

FIG. 9 is a table 400 of example operational process assessment criteria 402 and corresponding multiple dimension metrics. The example dimension metrics are a location metric 404, an outsourcing metric 406, and a transformation metric 408. Each metric 404, 406, and 408 may have a corresponding weight 410. The metrics 404, 406, and 408 may determine whether an operational process that is evaluated against the defined assessment criteria 402 and metrics 404, 406 and 408 is more eligible or less eligible for an optimization process.

The assessment criteria 402 may have a unit of measure 414 for evaluating an operational process. In this example, the unit of measure is High, Medium and Low, and indicates the degree to which a criterion applies to an operational process. For example, the criterion "Direct interaction with customers " would have a high applicability to the operational process of claims adjustment for an insurance company. Conversely, the same criterion would have a low applicability to an operational process of machining an engine block.

Other units of measure may also be used, depending on the assessment criteria. For example, an assessment criteria may have a binary unit of measure, e.g. Yes/No, or a quantifiable unit of measure, e.g., a currency amount, or a percentage.

Each metric 404, 406 and 408 is applied to increase the eligibility of an operational process based on an assessment criterion, as indicated by an up arrow symbol; or to decrease the eligibility of an operational process based on the assessment criterion, as indicated by a down arrow symbol; or does not affect the eligibility of an operational process based on the assessment criterion, as indicated by a marked box symbol. For example, the criterion "Direct interactions with the customers" tends to reduce the eligibility of a process to undergo optimizations based on the location metric 404 and outsourcing metric 406. Conversely, the criterion "Extended hours of service required" tends to increase the eligibility of a process to undergo optimizations based on the location metric 404 and outsourcing metric 406. Adjusting the weights 410 for each metric 404, 406 and 408 may further reduce or increase the eligibility of an operational process.

The assessment criteria 402 may comprise different criteria categories, such as an Operating Model category 416, a Business Skills category 418, a Volume category 420, and a Strategic Importance category 422. Additional categories may also be used.

FIG. 10 is a table 440 of dimensional scores corresponding to the assessment criteria 402 and dimension metrics 404, 406 and 408 of FIG. 9. The operational processes "First," "Second," "Third," "Fourth," "Fifth" and "Sixth," for example, are evaluated against the assessment criteria 402 and corresponding metrics 404, 406, 408 by entering corresponding measurements into data columns 441, 442, 443, 444, 445 and 446. Based on the measurements in the data columns 441, 442, 443, 444, 445 and 446, the operational processes are scored against the assessment criteria 402 and corresponding metrics 404, 406 and 408 to generate location metric scores 450, sourcing metric scores 452, and transformation metric scores 454 for each operational process. In FIG. 10, the scores 450, 452 and 454 are shown only for the "First" operational process. The location metric scores 450, sourcing metric scores 452, and transformation metric scores 454 are used to generate a location score 451, sourcing score 453 and transformation score 455 for each operational process.

FIG. 11 is a table 460 of example sourcing location assessment criteria 462 and site metrics 464. Sourcing locations are evaluated against the defined assessment criteria 462 and site metrics 464 to determine which sourcing location is best qualified to receive and operational process.

The site metrics 464 are applied to increase the qualification of a location, as indicated by an up arrow symbol; or to decrease the qualification of a location, as indicated by a down arrow symbol; or does not affect the qualification of a location, as indicated by a marked box symbol. Adjusting the weights 466 associated with each site metric 464 may further reduce or increase the qualification of a location.

The assessment criteria 462 may comprise different criteria categories, such as a prerequisites category 470, a non-project specific category 472, and a project specific category 474. The assessment criteria 462 may have unit of measure 468 for evaluating sourcing locations. In this example, the units of measure depend on the particular assessment criterion. The prerequisites criteria 470 have quantified units of measure, e.g., a currency value or percentage rate; the non-project specific criteria 472 have a high, medium or low unit of measure; and the project specific criteria 474 have a binary unit of measure.

FIG. 12 is a table 480 for an example evaluation of onshore, nearshore and offshore locations. In FIG. 12, the sourcing locations of Paris, Nice, Munich, Warsaw, Montreal, Bhratpur, Delhi and Mexico City are evaluated against the assessment criteria 462 and corresponding metrics 464 by entering corresponding measurements in to data columns 481, 482, 483, 484, 485, 486, 487 and 488. Based on the data in the data columns 481-488, each provider location may be evaluated based on the corresponding prerequisite criteria 470 and non-project specific criteria 472. Additionally, each site may be further evaluated against an operational process by comparing its corresponding project specific compentencies 474 to the competency requirements of the operation process.

FIG. 13 provides summary tables 490, 491 and 492 of example evaluations based on the data of the table of FIG. 12. Table 490 summarize the results of an evaluation of the onshore provider locations of Paris, Nice and Munich against the operational process "Sixth," which may, for example, be an operational process that is to be optimized onshore. A generic score column 500 list generic score 502 based on the prerequisite scores and non-project specific scores generated by the evaluation of each provider location against assessment criteria 470 and 472 and corresponding site metrics 464. In one implementation, the generic scores 502 are an average of the prerequisite score and non-project specific score for each provider location. In another implementation, the generic scores 502 may be based on an adjustable weighting of the prerequisite scores and non-project specific scores for each provider location. Corresponding score symbols 504 are also listed within the generic score column 500.

A prerequisite score column 510 lists the prerequisite scores 512 and corresponding score symbols 514 generated by the evaluation of each provider location against the prerequisite assessment criteria 470 and corresponding site metrics 464. A non-project specific score column 520 provides non-project specific scores 522 and corresponding score symbols 524 generated by the evaluation of each provider location against the non-project specific assessment criteria 472 and corresponding site metrics 464.

A Sixth process specific score column 530 provides Sixth process specific scores 532 generated by the evaluation of each provider location against the project specific assessment criteria 474 and corresponding site metrics 464. Corresponding score symbols 534 are also listed.

The provider location of Nice has the highest Sixth process specific score 532, i.e., 6.4 compared to 5.7 for Paris and Munich. This score is based on the available competencies of the provider location as evaluated against the competency requirements of the operational process. For example, the Sixth process may require competencies 1, 3 and 4. As shown in FIG. 12, Nice has competencies 1, 3 and 4. Paris, however, does not have competency 3 and Munich does not have competency 4. Accordingly, the provider location of Nice is evaluated to have a higher process specific score. When combined with the generic score 502, the provider location of Nice is determined to be the best location for receiving the Sixth process, as it also has the highest generic score, i.e., 6.5 as compared to 5.1 for Paris and 5.9 for Munich.

The determination of which provider location is best qualified to received an operational process may be based on an average of the process specific score and the generic score. In another implementation, the determination may be based on an adjustable weighting of the generic score and process specific score.

Table 491 provides a similar summary for nearshore provider locations for a Second process, a Third process and a Fifth process, and table 492 provides a similar summary for offshore provider locations for a First process and a Fourth process. As shown in table 491, Montreal is determined to be the best provider location for receiving the Second process, Third process and the Fifth process. Likewise, in table 491, Delhi is shown to be the best provider location for the First process, and Mexico City is shown to be the best provider location for the Fourth process.

An evaluation process similar to that as described with reference to FIGS. 11-13 above may be used for identifying providers best qualified to perform operational processes. Candidate providers may be evaluated for each process based on process specific assessment criteria and non-project specific assessment criteria to identify providers that are best qualified to perform specific operational processes. The analysis and selection of providers is described with reference to FIGS. 14-18 below.

FIG. 14 is a table 600 of providers to analyze for outsourcing or out-tasking. In this example implementation, column 602 lists all processes that are identified to be outsourced or out-tasked. In particular, outsource rows 604 list processes to be outsourced, and out-task rows 606 list processes to be out-tasked. Column 608 lists the types of providers that should be matched to each process. For example, process #1 should be performed by a business processing outsourcing (BPO) provider with transformational capabilities; process #2 should be performed by a BPO provider with specific expertise, e.g., specific expertise for a particular process or specific expertise at outsourcing; process #3 and process #4 should be performed by an information technology outsourcing provider; and process #5 should be performed by a provider with some other particular capability.

FIG. 15 is a table 610 of providers to analyze by provider expertise. In this example implementation, column 612 lists BPO providers with transformational capabilities; column 614 list BPO providers with specific expertise; column 616 list IT outsourcing providers, and column 618 lists other providers. Rows 620 list existing providers with which the entity 101 may already have a relationship, and rows 622 list new providers that may be new to the market or that may not have a preexisting relationship with the entity 101. Providers #1-8 may be listed in the table according to their corresponding status as defined the row and column categories. In another implementation, the providers #1-8 may also be selected subject to their availability at particular sites determined according to the process described with respect to FIGS. 11-13 above.

FIG. 16 is a table 630 of example provider assessment criteria and provider metrics. Providers are evaluated against the defined assessment criteria 632 and provider metrics 634 to determine which provider is best qualified to perform an operational process.

The provider metrics 634 are applied to increase the qualification of a provider, as indicated by an up arrow symbol; or to decrease the qualification of a provider, as indicated by a down arrow symbol; or does not affect the qualification of a provider, as indicated by a marked box symbol. Adjusting the weights 636 associated with each provider metric 632 may further reduce or increase the qualification of a provider.

The assessment criteria 632 may comprise different criteria categories, such as a generic provider category 640, and a project specific category 642. The assessment criteria 632 may have unit of measure 638 for evaluating sourcing locations. In this example, the units of measure depends on the particular assessment criterion. The project specific provider criteria 642 also includes criteria indicating whether a provider has experience with a particular process and/or is able to perform a process, e.g., whether the provider has previously performed the process or similar processes, or if the provider may even be able to perform the process.

FIG. 17 is a table 650 of example evaluation data for providers. In FIG. 17, the providers #1-8 are evaluated against the assessment criteria 632 and corresponding metrics 634 by entering corresponding measurements into data columns 651, 652, 653, 654, 655, 656, 657 and 658. Based on the data in the data columns 651-658, each provider may be evaluated based on the corresponding generic criteria 640 and project specific criteria 642. In one implementation, the data relating to the generic criteria 640 is used to generate a generic score, and the data related to the project specific criteria is used to generate a process specific score. The scores may be used to generate a global score that may be a weighted summed score, averaged score, or simply a summed score for each provider.

Figure 18:
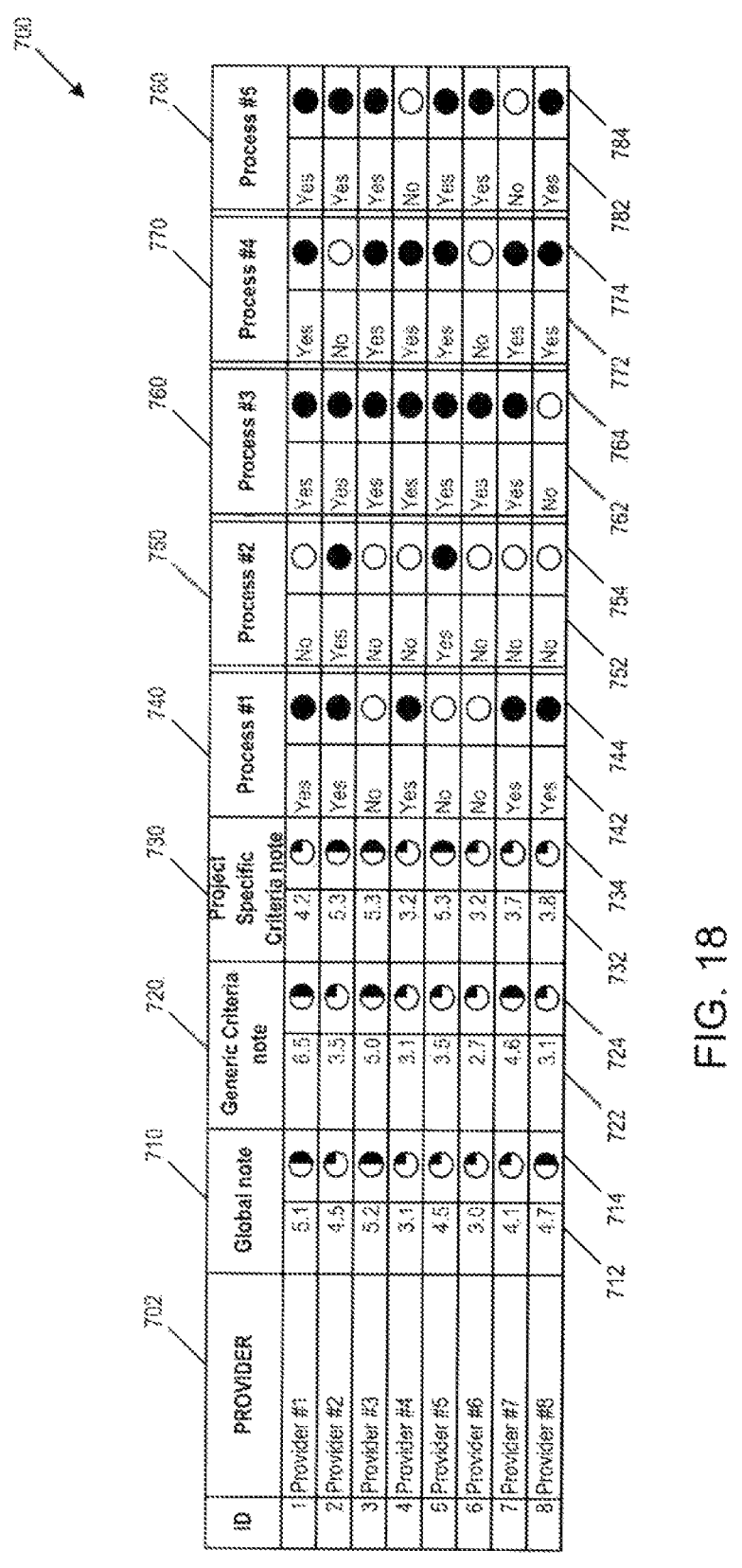

FIG. 18 is a summary table 700 of the example evaluations based on the data of FIG. 17. A provider column 702 lists the candidate providers. A global note column 710 lists the global scores 712 that are based on the generic scores 722 listed in a generic column 720 and process specific scores 732 that are listed in a process specific column 734. Corresponding score symbols 714, 724 and 734 are also listed within the score columns 710, 720 and 730. Process columns 740, 750, 760, 770 and 780 include process capability columns 742, 752, 762, 772 and 782 and corresponding graphical capability symbols 744, 754, 764, 774 and 784. In this example implementation, the process columns 742, 752, 762, 772 and 782 indicate whether a particular provider may perform a corresponding process. In another implementation, the process columns 742, 752, 762, 772 and 782 may indicate whether a particular provider has previous or current experience with a corresponding process.

In the example implementation of FIG. 18, the provider with the highest global score is best suited to perform a process, based on all the criteria and metrics described with reference to FIGS. 14-17 above. For example, provider #3 may be best suited to perform processes 3, 4 and 5, as it has the highest score of 5.3 and is eligible to perform these processes; provider #1 may be best suited to perform process #1, as it has the next highest score of 5.1 and is eligible to perform this process; and providers #2 or 5 are equally suited to perform process #2, as they have the next highest score of 4.5 and are eligible to perform these processes.

In another implementation, provider eligibility for a process may be further subject to selection logic that determines whether the provider is located within a location selected for receiving the process. For example, if process #1 is to be outsourced, and provider #1 does not have a presence at the outsourcing location deemed most suitable to receive process #1, then the process column 742 and corresponding graphical capability symbol 744 may indicate "No."

The results of the provider location analysis and provider analysis may be further summarized by graphically depicting the provider locations best qualified to receive an operational process and the providers best qualified to perform the operational process. For example, in FIG. 8 above, the Sixth process corresponds to the graphical display element 230; the Second process corresponds to the graphical display element 222; the Third process corresponds to the graphical display element 224; the Fifth process corresponds to the graphical display element 228; the First process corresponds to the graphical display element 220; and the Fourth process corresponds to the graphical display element 226.

Figure 19:
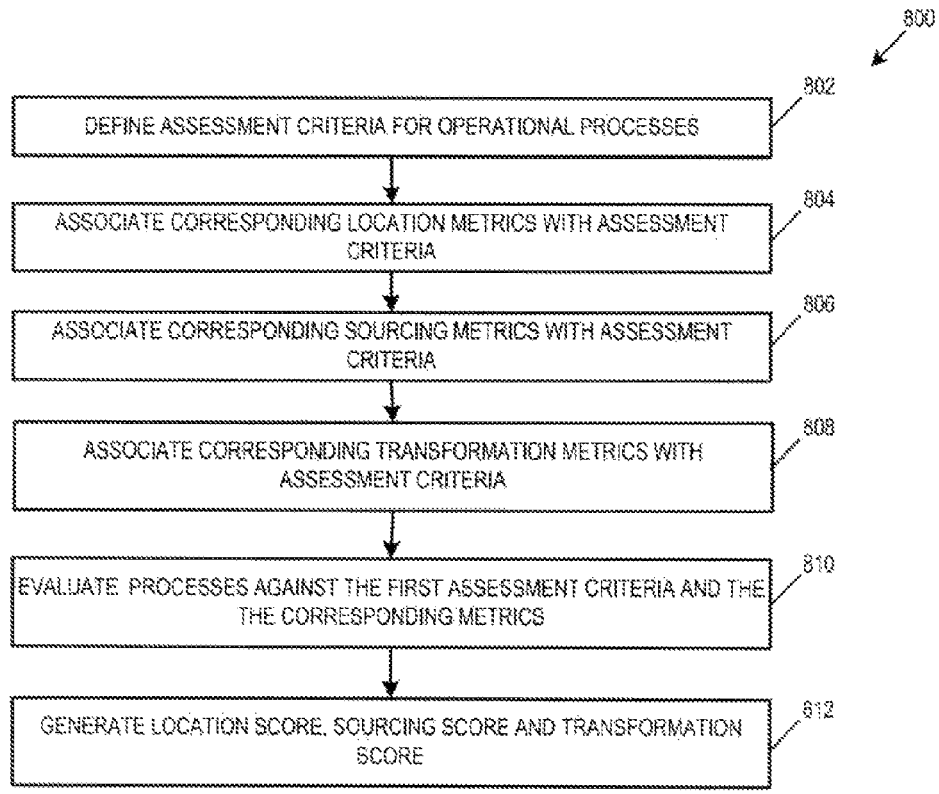
FIG. 19 is flow diagram of an example process of analyzing operational processes.

FIG. 19 is flow diagram 800 of an example process of analyzing operational processes. Stage 802 defines assessment criteria for operational processes. Stage 804 associates corresponding location metrics with the assessment criteria. Stage 806 associates corresponding sourcing metrics with the assessment criteria. Stage 808 associates corresponding transformation metrics with the assessment criteria. Stage 810 evaluates processes against the first assessment criteria and the corresponding metrics. Stage 812 generates a location score, sourcing score, and transformation score based on the evaluation. These scores may be used to identify one or more optimization processes for the operational processes.

Figure 20:
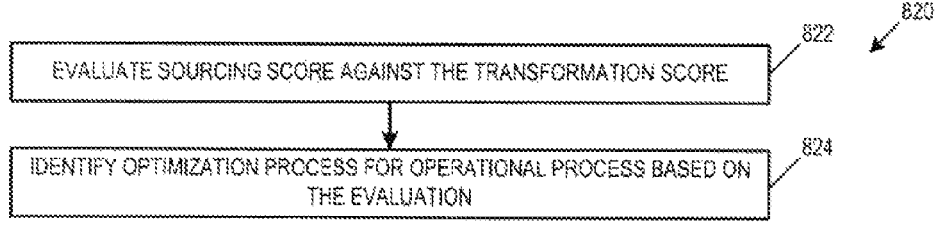
FIG. 20 is a flow diagram of an example process of identifying optimization processes based on sourcing and transformation metrics.
Figure 21:
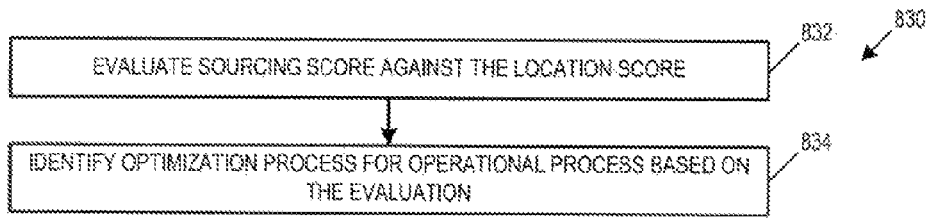

FIG. 20 is a flow diagram 820 of an example process of identifying optimization processes based on sourcing and transformation metrics. Stage 822 evaluates the sourcing score against the transformation score. Stage 824 identifies optimization processes for the operational processes based on the evaluation. Example optimization processes include reengineering an operational process, out-tasking an operational process, outsourcing an operational process, or keeping the operational process as is.

Figure 22:
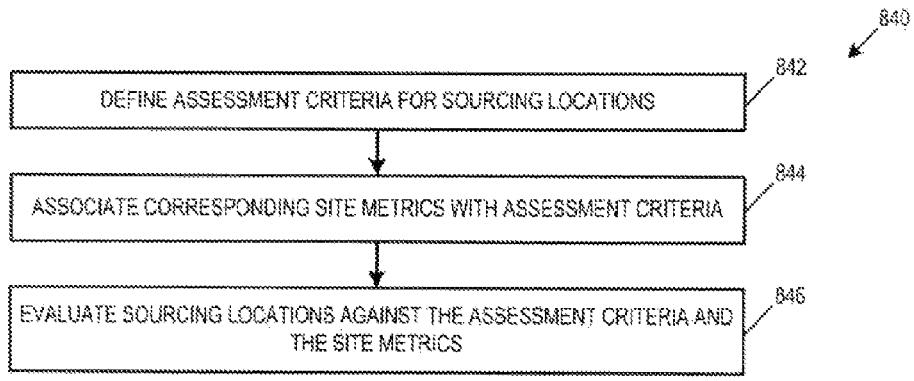
FIG. 22 is a flow diagram of an example process of identifying optimization processes based on sourcing and location metrics.

FIG. 22 is a flow diagram 830 of an example process of identifying optimization processes based on sourcing and location metrics. Stage 832 evaluates the sourcing score against the location score. Stage 834 identifies optimization processes for the operational processes based on the evaluation. Example optimization processes include moving a process to an offshore location, a nearshore location, or an onshore location. The optimization processes may also include determining whether execution of the operational process should be first party managed or third party managed.

FIG. 22 is a flow diagram 840 of an example process of evaluating sourcing location. Stage 842 defines assessment criteria for sourcing locations. The assessment criteria may include process specific assessment criteria and non-process specific assessment criteria. Stage 844 associates corresponding site metrics with the assessment criteria. Stage 846 evaluates the sourcing locations against the assessment criteria and the site metrics.

Figure 23:
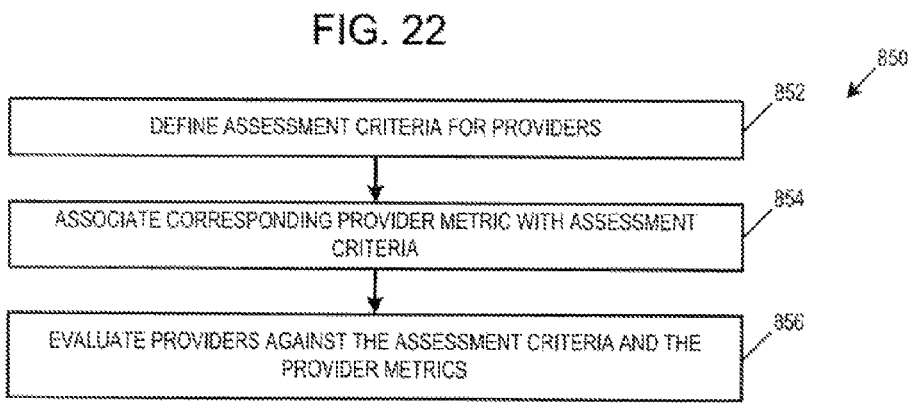
FIG. 23 is a flow diagram of an example process of evaluating providers.

FIG. 23 is a flow diagram 850 of an example process of evaluating providers. Stage 852 defines assessment criteria for providers. The assessment criteria may include process specific assessment criteria and non-process specific assessment criteria. Stage 854 associates corresponding provider metrics with the assessment criteria. Stage 856 evaluates the sourcing providers against the assessment criteria and the provider metrics.

Figure 24:
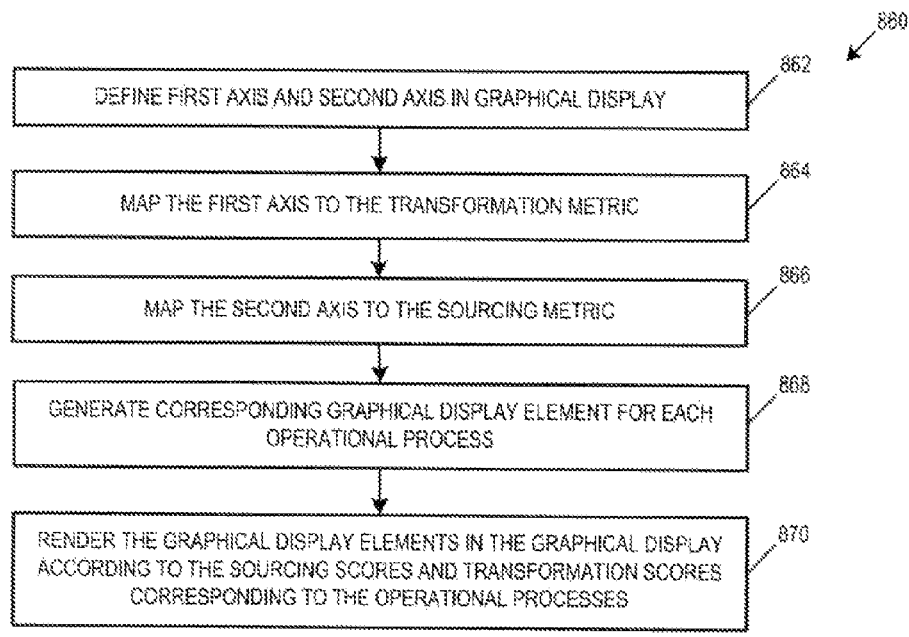
FIGS. 24 and 25 are flow diagrams of example processes of graphically displaying an analysis of operational processes according to a sourcing metric and a transformation metric.
Figure 25:
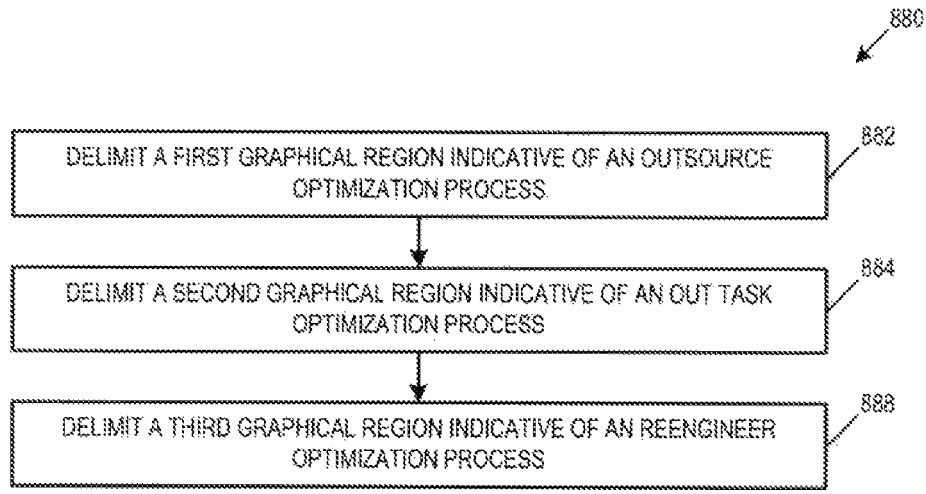

FIGS. 24 and 25 are flow diagrams of example processes of graphically displaying an analysis of operational processes according to a sourcing metric and a transformation metric. In flow diagram 860, stage 862 defines a first axis and a second axis in a graphical display. Stage 864 maps the first axis to the transformation metric. Stage 866 maps the second axis to the sourcing metric. Stage 868 generates corresponding graphical display elements for each operational process. Stage 870 renders the graphical display elements in the graphical display according to the sourcing scores and the transformation scores corresponding to the operational processes.

The graphical display elements may be rendered in delimited areas that correspond to recommended optimization processes. In flow diagram 880, stage 882 delimits a first graphical region indicative of an outsource optimization process. Stage 884 delimits a second graphical region indicative of an out-task optimization process. Stage 886 delimits a third graphical region indicative of a reengineer optimization process. Additional areas may also be delimited in the graphical region, such as an area that corresponds to a keep as is optimization process.

Figure 26:
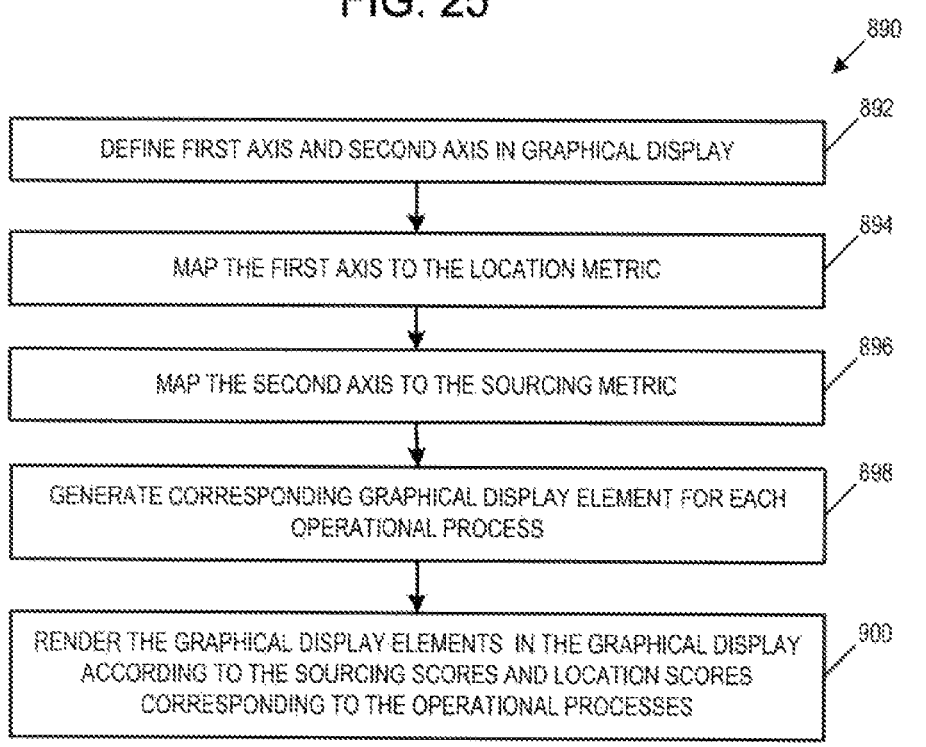
FIGS. 26 and 27 are flow diagrams of example processes of graphically displaying an analysis of operational processes according to a sourcing metric and a location metric.
Figure 27:
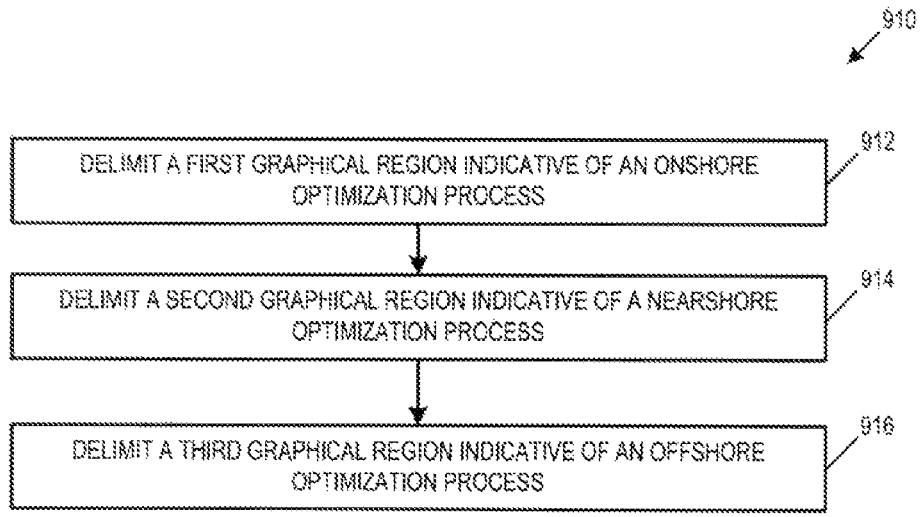

FIGS. 26 and 27 are flow diagrams of example processes of graphically displaying an analysis of operational processes according to a sourcing metric and location metric. In flow diagram 890, stage 892 defines a first axis and a second axis in a graphical display. Stage 894 maps the first axis to the location metric. Stage 896 maps the second axis to the sourcing metric. Stage 898 generates corresponding graphical display elements for each operational process. Stage 700 renders the graphical display elements in the graphical display according to the sourcing scores and the location scores corresponding to the operational processes.

The graphical display elements may be rendered in delimited areas that correspond to recommended optimization processes. In flow diagram 710, stage 712 delimits a first graphical region indicative of an onshore optimization process. Stage 714 delimits a second graphical region indicative of a nearshore optimization process. Stage 716 delimits a third graphical region indicative of an offshore optimization process. Additional areas may also be delimited in the graphical region, such as areas that correspond to either first party management or third party management of the operational process that is placed onshore, nearshore or offshore.

Figure 28:
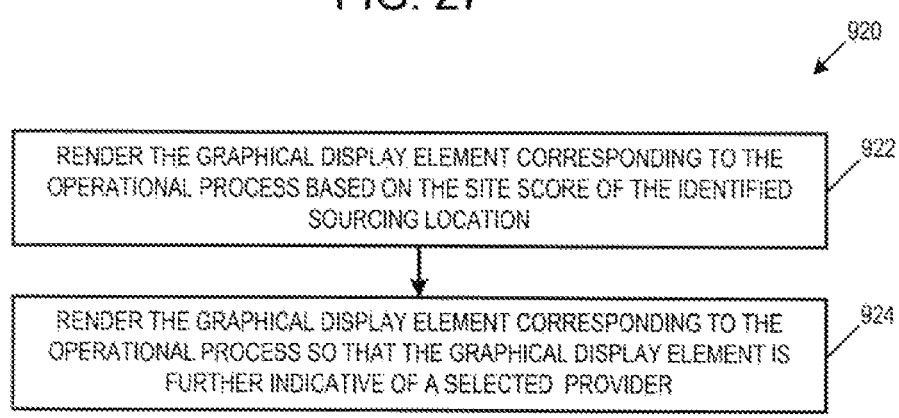
FIG. 28 is a flow diagram of an example process of graphically displaying the analysis of sourcing locations and providers.

FIG. 28 is a flow diagram 920 of an example process of graphically displaying the analysis of sourcing locations and providers. The example process of the flow diagram 920 may be used in conjunction with the example process of the flow diagram 910. Stage 922 renders the graphical display element corresponding to the operational process based on the site score of the identified sourcing location. The identified sourcing location is the sourcing location that is determined to be most adaptable to receive the operational process.

Stage 924 renders the renders the graphical display element corresponding to the operational process so that the display element is further indicative of a selected provider. The selected sourcing provider is the provider that is determined to be best qualified to perform the operational process.

Figure 29:
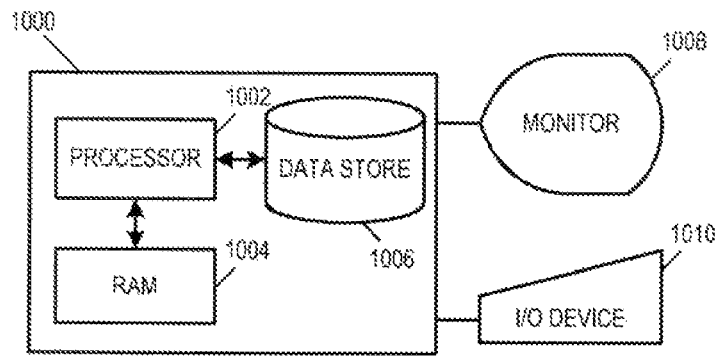
FIG. 29 is an example computer system that may be used to implement the systems and methods described herein.

FIG. 29 is an example computer system 1000 that may be used to implement the systems and methods described. The computer system 1000 may include a processor 1002 coupled to a computer readable memory 1004, such as a RAM or other data store. The computer system 1000 may also include another data store 1006, such as a database, a monitor 1008 and a keyboard 1010. The computer system 1000 may include program instructions executable by the processor 1002 to implement the process analysis systems and method disclosed herein. Although depicted as a single computer system 1000, computer system 1000 may be implemented as a network of computers.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this paten document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples et forth above, those of ordinary skill in the art may effect alterations, modifications and variations to the examples without departing from the scope of the invention.

What is claimed is:

1. A computer-implemented method comprising:
defining, by one or more computers, first assessment criteria for a possible onshore sourcing location, a possible nearshore sourcing location, and a possible offshore sourcing location;
associating corresponding site metrics with the first assessment criteria;
scoring the onshore sourcing location, the nearshore sourcing location, and the offshore sourcing location against the first assessment criteria and the corresponding site metrics to generate site scores for each sourcing location;
selecting a sourcing location, from among the onshore sourcing location, the nearshore sourcing location, and the offshore sourcing location, that is more qualified to receive an operational process under evaluation, based on the site scores;
defining second assessment criteria for a first party provider and a possible third party provider;
associating corresponding provider metrics with the second assessment;
scoring the first party provider and the third party provider against the second assessment criteria and the provider metrics to generate provider scores for each provider; and selecting a provider, from among the first party provider and the third party provider, that is more qualified to perform the operational process under evaluation, based on the provider scores.

2. The method of claim 1, further comprising:
defining third assessment criteria for a possible reengineering process, a possible out-tasking process, a possible outsourcing process, and a non-transformation process;
associating corresponding transformation metrics with the third assessment criteria;
scoring the reengineering process, the out-tasking process, the outsourcing process, and the non-transformation process against the third assessment criteria to generate transformation scores for each process; and
selecting an optimization process, from among the reengineering process, the out-tasking process, the outsourcing process, and the non-transformation process, to perform on the operational process under evaluation, based on the transformation scores.

3. The method of claim 2, further comprising:
comparing the site score for the selected sourcing location against the transformation score for the selected optimization process; and
identifying a different optimization process for the operational process under evaluation based on comparing the site score against the transformation score.

4. The method of claim 2, further comprising:
defining a first axis and a second axis in a graphical display;
mapping the first axis to one of the transformation metrics;
mapping the second axis to one of the sourcing metrics;
generating a corresponding graphical display element for the operational process; and
rendering the graphical display element on the graphical display according to the sourcing score and the transformation score corresponding to the operational process.

5. The method of claim 4, further comprising:
delimiting in the graphical data display a first graphical region indicative of the outsource process;
delimiting in the graphical data display a second graphical region indicative of the out-task process;
delimiting in the graphical data display a third graphical region indicative of the reengineering process; and
delimiting in the graphical data display a fourth graphical region indicative of the non-transformation process.

6. The method of claim 4, further comprising:
scaling a size of the graphical display element according to a resource requirement of the corresponding operational process.

7. The method of claim 1, wherein the first assessment criteria comprise:
assessment criteria that are not specific to the operational process under evaluation; and
assessment criteria that are specific to the operational process under evaluation.

8. A system comprising:
one or more computers; and
a computer-readable medium coupled to the one or more computers having instructions stored thereon which, when executed by the one or more computers, cause the one or more computers to perform operations comprising:
defining first assessment criteria for a possible onshore sourcing location, a possible nearshore sourcing location, and a possible offshore sourcing location,
associating corresponding site metrics with the first assessment criteria,
scoring the onshore sourcing location, the nearshore sourcing location, and the offshore sourcing location against the first assessment criteria and the corresponding site metrics to generate site scores for each sourcing location,
selecting a sourcing location, from among the onshore sourcing location, the nearshore sourcing location, and the offshore sourcing location, that is more qualified to receive an operational process under evaluation, based on the site scores,
defining second assessment criteria for a first party provider and a possible third party provider,
associating corresponding provider metrics with the second assessment,
scoring the first party provider and the third party provider against the second assessment criteria and the provider metrics to generate provider scores for each provider, and
selecting a provider, from among the first party provider and the third party provider, that is more qualified to perform the operational process under evaluation, based on the provider scores.

9. The system of claim 8, wherein the operations further comprise:
comparing the site score for the selected sourcing location against the transformation score for the selected optimization process; and
identifying a different optimization process for the operational process under evaluation based on comparing the site score against the transformation score.

10. The system of claim 8, wherein the operations further comprise:
defining a first axis and a second axis in a graphical display;
mapping the first axis to one of the transformation metrics;
mapping the second axis to one of the sourcing metrics;
generating a corresponding graphical display element for the operational process; and
rendering the graphical display element on the graphical display according to the sourcing score and the transformation score corresponding to the operational process.

11. The system of claim 10, wherein the operations further comprise:
delimiting in the graphical data display a first graphical region indicative of the outsource process;
delimiting in the graphical data display a second graphical region indicative of the out-task process;
delimiting in the graphical data display a third graphical region indicative of the reengineering process; and
delimiting in the graphical data display a fourth graphical region indicative of the non-transformation process.

12. The system of claim 10, wherein the operations further comprise:
scaling a size of the graphical display element according to a resource requirement of the corresponding operational process.

13. The system of claim 8, wherein the first assessment criteria comprise:
assessment criteria that are not specific to the operational process under evaluation; and
assessment criteria that are specific to the operational process under evaluation.

14. A computer storage medium encoded with a computer program, the program comprising instructions that when executed by one or more computers cause the one or more computers to perform operations comprising:

defining first assessment criteria for a possible onshore sourcing location, a possible nearshore sourcing location, and a possible offshore sourcing location;

associating corresponding site metrics with the first assessment criteria;

scoring the onshore sourcing location, the nearshore sourcing location, and the offshore sourcing location against the first assessment criteria and the corresponding site metrics to generate site scores for each sourcing location;

selecting a sourcing location, from among the onshore sourcing location, the nearshore sourcing location, and the offshore sourcing location, that is more qualified to receive an operational process under evaluation, based on the site scores;

defining second assessment criteria for a first party provider and a possible third party provider;

associating corresponding provider metrics with the second assessment;

scoring the first party provider and the third party provider against the second assessment criteria and the provider metrics to generate provider scores for each provider; and selecting a provider, from among the first party provider and the third party provider, that is more qualified to perform the operational process under evaluation, based on the provider scores.

15. The computer storage medium of claim 14, wherein the operations further comprise:

comparing the site score for the selected sourcing location against the transformation score for the selected optimization process; and identifying a different optimization process for the operational process under evaluation based on comparing the site score against the transformation score.

16. The computer storage medium of claim 14, wherein the operations further comprise:

defining a first axis and a second axis in a graphical display;

mapping the first axis to one of the transformation metrics;

mapping the second axis to one of the sourcing metrics;

generating a corresponding graphical display element for the operational process; and rendering the graphical display element on the graphical display according to the sourcing score and the transformation score corresponding to the operational process.

17. The computer storage medium of claim 16, wherein the operations further comprise:

delimiting in the graphical data display a first graphical region indicative of the outsource process;

delimiting in the graphical data display a second graphical region indicative of the out-task process;

delimiting in the graphical data display a third graphical region indicative of the reengineering process; and delimiting in the graphical data display a fourth graphical region indicative of the non-transformation process.

18. The computer storage medium of claim 16, wherein the operations further comprise:

scaling a size of the graphical display element according to a resource requirement of the corresponding operational process.

19. The computer storage medium of claim 14, wherein the first assessment criteria comprise:

assessment criteria that are not specific to the operational process under evaluation; and assessment criteria that are specific to the operational process under evaluation.

\* \* \* \* \*